United States Patent [19]

Lyle

[11] Patent Number: 4,536,624
[45] Date of Patent: Aug. 20, 1985

[54] TELEPHONE ANSWERING MACHINE INTERFACE CIRCUIT

[75] Inventor: Stephen V. Lyle, San Pedro, Calif.

[73] Assignee: T.A.D. Avanti, Inc., Compton, Calif.

[21] Appl. No.: 457,663

[22] Filed: Jan. 13, 1983

[51] Int. Cl.³ .............................................. H04M 1/00
[52] U.S. Cl. ........................... 179/170 NC; 179/6.01; 179/2 C; 179/81 R
[58] Field of Search ............... 179/2 C, 170 NC, 6.01, 179/6.02, 6.03, 81 R, 81 B, 6.04, 6.05, 6.06, 6.07, 6.08, 6.09, 6.1, 6.11, 6.13, 6.14, 6.15, 6.16, 6.18

[56] References Cited
U.S. PATENT DOCUMENTS
4,214,130 7/1980 Questad ............................ 178/81 R Primary Examiner—James L. Dwyer
Attorney, Agent, or Firm—Keith D. Beecher

[57] ABSTRACT

An interface circuit is provided for a telephone answering machine which does not require a transformer and which provides the proper direct current and alternating current terminating impedance for the telephone line. The direct current terminating impedance is provided by connecting a resistor of a selected resistance value across the telephone line, and the alternating current terminating impedance is achieved by multiplying the effective impedance of the resistor for alternating current audio signals by providing an amplifier for the outgoing audio signals with positive feedback of amounts sufficient to provide the desired impedance multiplication effect but which is insufficient to sustain oscillation.

5 Claims, 4 Drawing Figures

TELEPHONE ANSWERING MACHINE INTERFACE CIRCUIT

BACKGROUND OF THE INVENTION

It is the usual practice to provide a transformer in the circuit which interfaces a telephone answering machine with the telephone line. This transformer serves as a direct current isolating means, and also as a means for transforming the single ended audio output of the telephone answering machine to a balanced output for application to the telephone line, and vice versa.

The transformer in the prior art interface circuit also serves to provide the proper direct current and alternating current terminating impedance for the telephone line. For example, most telephone systems require that the value of the direct current terminating impedance must be kept between 90 and 275 ohms, and that the audio signal alternating current terminating impedance be of the order of 600 ohms. These requirements are met in the prior art interface circuit by using a 1:1 turns ratio transformer with, for example, a 600 ohm resistor in its secondary circuit. The direct current primary resistance of the transformer is given a selected value to provide the required 90–275 ohm direct current terminating impedance for the telephone line; and for audio signals, the resistance of the 600 ohm resistor is reflected into the primary circuit of the transformer to provide the required alternating current terminating impedance for the line. However, the transformer used in the prior art interface circuits is bulky, heavy and expensive, and it also adversely affects the quality of the incoming and outgoing audio signals. The circuit of the present invention achieves all the criteria of the prior art circuit described above, but does not require a transformer, so that all the disadvantages of the transformer, as set forth above, are eliminated.

DETAILED DESCRIPTION OF THE ILLUSTRATED EMBODIMENT

Figure 1:
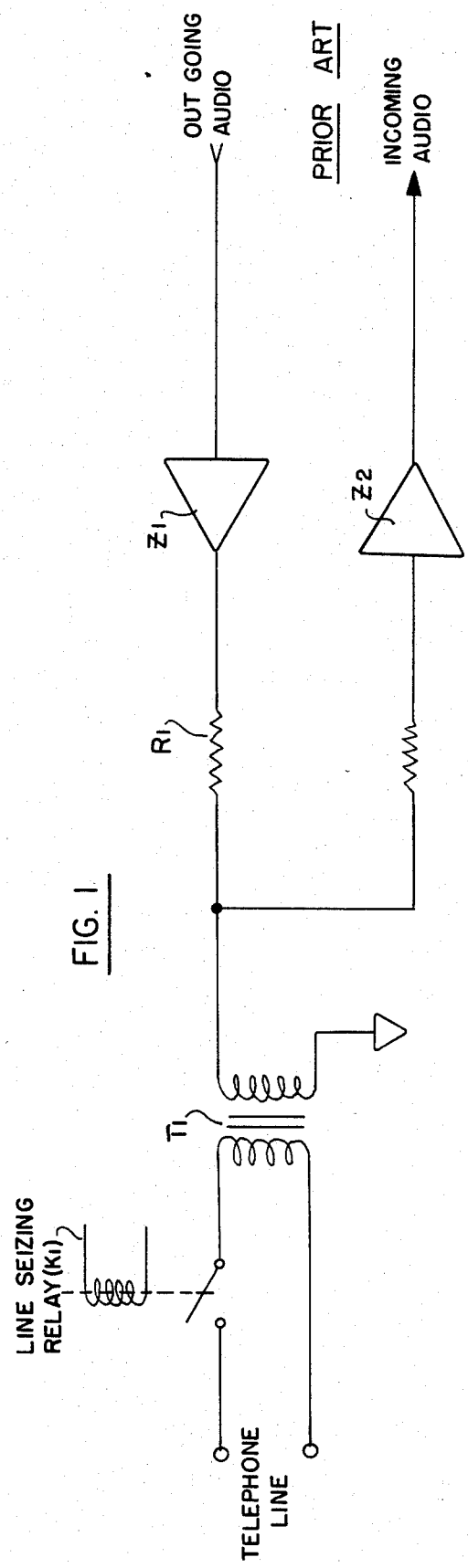
FIG. 1 is a simplified circuit diagram of a prior art interface circuit for coupling a telephone answering machine to the telephone line.

In the prior art circuit of FIG. 1, a transformer T1 having a turns ratio, for example, of 1:1 is used to couple a telephone answering machine to the telephone line. A usual line seizing relay K1 is used to connect the circuit to the telephone line. The circuit includes a transmit amplifier Z1 and a receive amplifier Z2. A resistor R1 of, for example, 600 ohms is used to connect the output of the amplifier Z1 to the secondary winding of the transformer T1. The primary winding of the transformer T1 is connected across the telephone line in a balanced state, whereas one side of the secondary of transformer T1 is connected to ground.

The direct current resistance of the primary of transformer T1 must be carefully controlled properly to terminate the telephone line, and this resistance must be between 90 and 275 ohms. For audio signals, the telephone line should be terminated by an alternating current impedance of the order of 600 ohms. This is accomplished by providing the resistor R1 in the secondary circuit of the transformer T1, the resistance of resistor R1 being reflected back through the 1:1 turns ratio of the transformer into the primary circuit as an alternating current terminating impedance insofar as audio signals are concerned.

Figure 2:
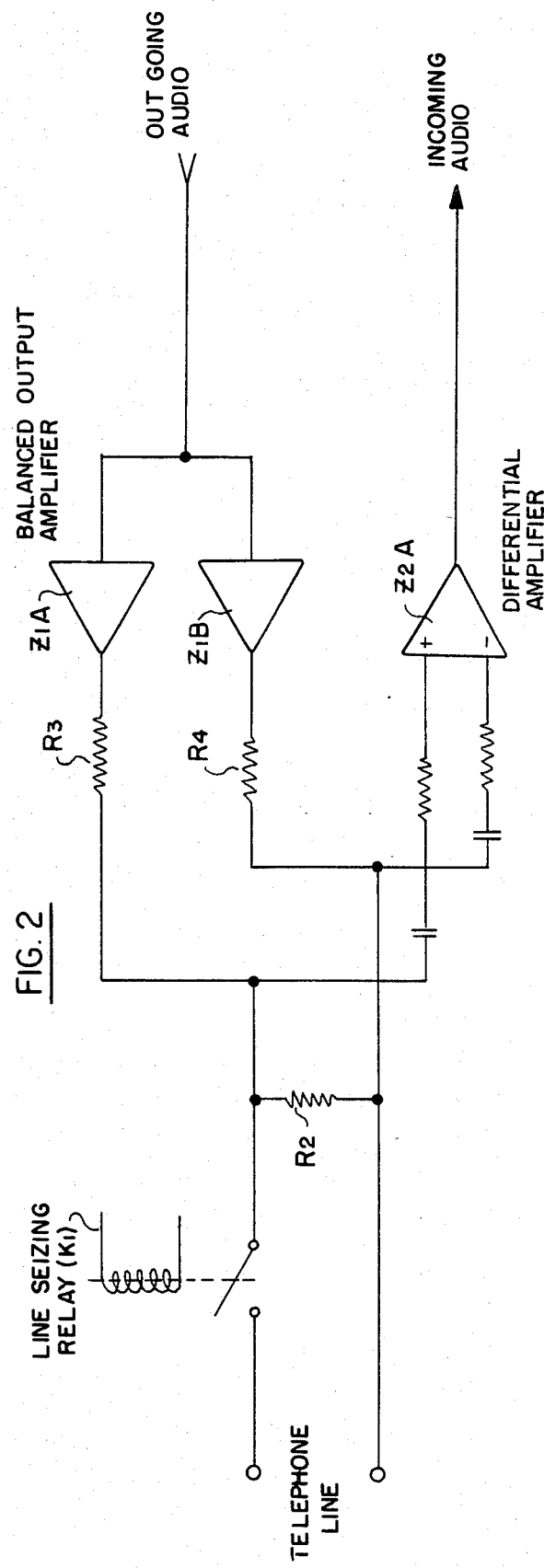
FIG. 2 is a simplified circuit diagram of a manner in which the single-ended signals in the telephone answering machine may be transformed to balanced signals for the telephone line, without the requirement of a transformer.

In the circuit of FIG. 2, the transmit amplifier Z1 is replaced by a balanced output amplifier Z1A and Z1B; and the receive amplifier Z2 is replaced by a differential amplifier Z2A. Resistors R3 and R4 are provided at the outputs of the differential transmit amplifier, each having a value of 620 ohms, to provide sufficient resistance for the outputs of the amplifier so that the amplifier may operate properly.

The circuit of FIG. 2 provides for the single-ended out-going audio signals to be transformed into balanced audio signals for application to the telephone line, and for the balanced signals received from the telephone line to be transformed into single-ended audio signals for the telephone answering machine.

There is no problem in terminating the telephone line for direct current, this being achieved, for example, by connecting a 150 ohm resistor R2 across the line. However, the circuit of FIG. 2 has the same alternating current impedance as the direct current impedance, so that the telephone line is over-terminated for audio signals. This problem is overcome by the circuit of FIG. 3 by providing a small amount of positive feedback through a 0.1 microfarad capacitor C1 and through a 13 kilo-ohm resistor R5. The circuit shown in FIG. 3 represents that portion of the circuit of FIG. 2 for transmitting audio signals to the telephone line, the outgoing audio signals being introduced to the inverting input of amplifier Z1A through a resistor R11.

Figure 3:
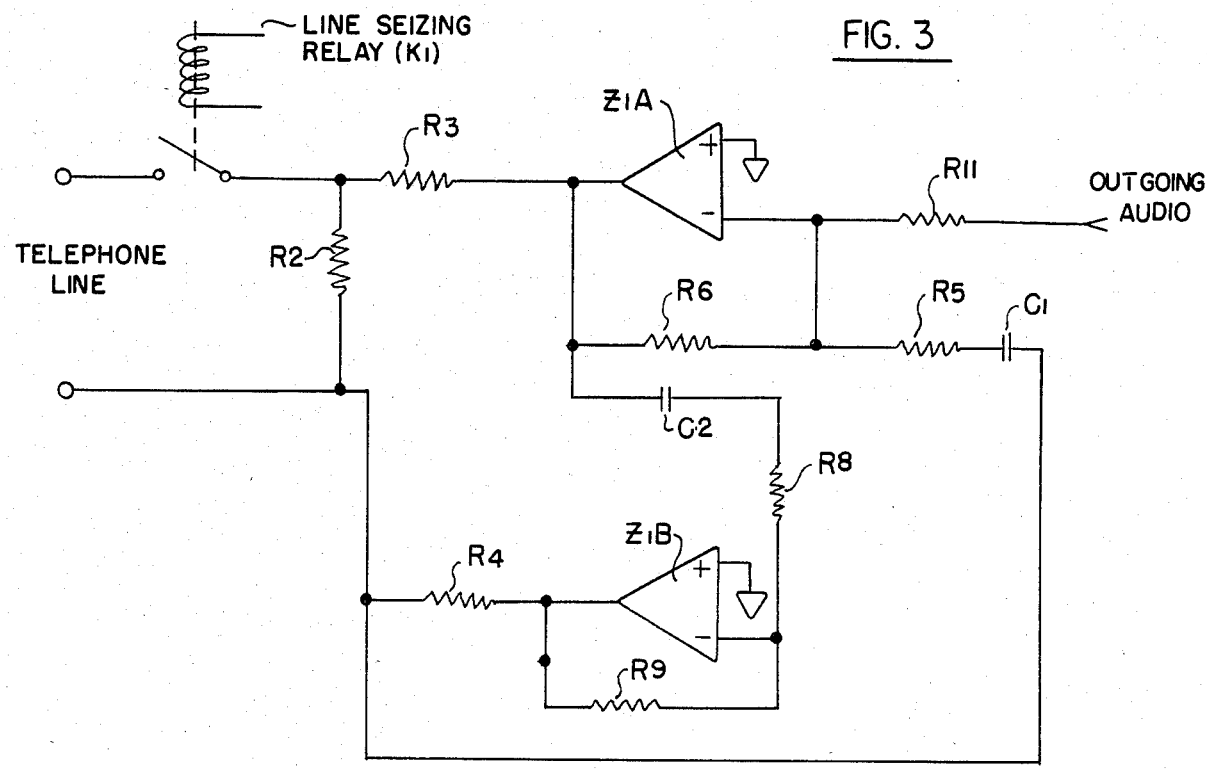
FIG. 3 is a circuit diagram representing one embodiment of the invention, and illustrating how the circuit of FIG. 2 may be modified so that the required direct current impedance and alternating current impedance may be provided for terminating the telephone line.

In the circuit of FIG. 3, the non-inverting input of amplifier Z1A is grounded, and the inverting input is connected to a 100 kilo-ohm resistor R6. The junction of resistors R6 and R3 is connected to the output of amplifier Z1A, and through a series connected 0.1 microfarad capacitor C2 and a 10 kilo-ohm resistor R8 to the inverting input of amplifier Z1B, the non-inverting input of amplifier Z1B being grounded. The inverting input of amplifier Z1B is also connected to a 10 kilo-ohm resistor R9 which is connected to the output of amplifier Z1B. The amplifiers Z1A and Z1B may be of the type designated 324.

In the circuit of FIG. 3, the output amplifier Z1A is the main amplifier, and amplifier Z1B functions as a unity gain inverting amplifier. The latter amplifier operates from the output of amplifier Z1A to provide a balanced bridged output between the output of amplifier Z1A and the output of amplifier Z1B. The output is a function of the value of resistors R8 and R9 which set the gain of amplifier Z1B, and also the match between resistors R3 and R4 which provide summing into resistor R2.

As mentioned above, a small amount of positive feedback is applied to amplifier Z1A by the action of the capacitor C1 and resistor R5. With no feedback in the circuit of FIG. 3, that is, for direct current conditions, the telephone line is terminated by an impedance of the order of 130 ohms, which is the resistance of resistor R2 in parallel with resistors R3 and R4. However, the alternating current terminating impedance of the telephone line, due to the positive feedback action of amplifier Z1A increases to the order of 600 ohms, which fulfills the telephone system requirements. This effect is due to impedance multiplication of the direct current resistance due to the positive feedback which increases the voltage appearing across resistors R2, R3 and R4 and, accordingly, the effective impedance of the terminating resistors in the presence of alternating current signals.

The impedance multiplier ratio may be defined as: effective impedance over nominal impedance where nominal impedance is the direct current impedance terminating the telephone line without feedback (133 ohms for the circuit of FIG. 2).

Accordingly, the impedance multiplier ratio equals $(1/1-G)$ where G=positive feedback loop gain.

For the circuit of FIG. 2, G=(active gain Z1) (passive attenuation).

That is, $G = \left(\frac{100K}{13K}\right)\left(\frac{75}{75 + 620}\right) = 0.83$.

Therefore, the impedance multiplier ratio=5.88.

Accordingly, the effective alternating current impedance=(5.88)(133)=782 ohms.

It is noted that G must be less than unity so that there is no tendency for the circuit to oscillate.

In order to provide efficient utilization of components, it is desirable to use the circuit of FIG. 3, not only for transmitting audio signals to the telephone line, but also for transmitting audio signals from the telephone line to the telephone answering machine, without the need for any further amplifiers. This may be accomplished if the positive feedback loop is made differential. Then, the outputs from either amplifier Z1A or Z1B may be used for receiving audio signals from the telephone line. As stated above, when the positive feedback loop is differential, the circuit also has an immunity to unbalanced signals, such as noise.

Figure 4:
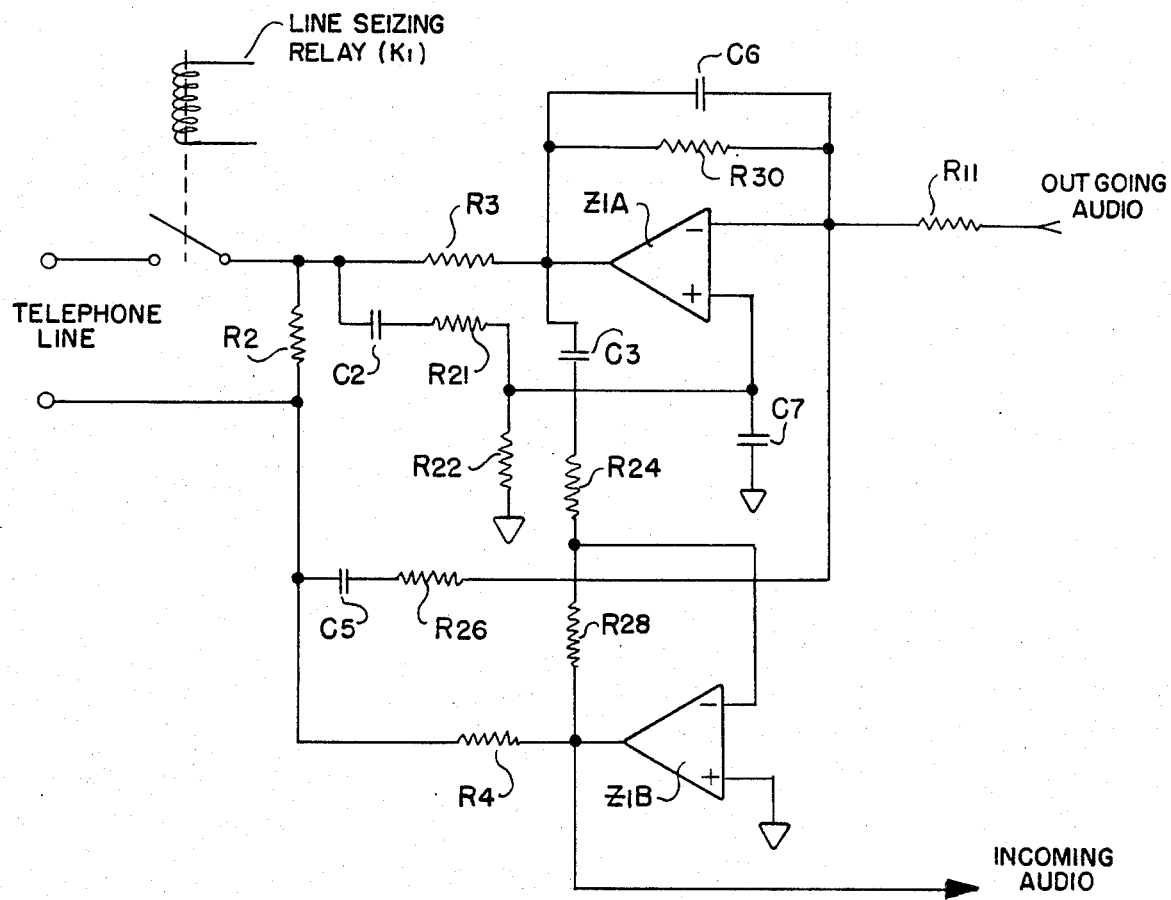
FIG. 4 is a modification of the circuit of FIG. 3, so that only balanced signals from the telephone line are translated, and the circuit is unresponsive to unbalanced signals such as noise.

Such a circuit is shown in FIG. 4. In the circuit of FIG. 4, the telephone line is terminated by a 330 ohm resistor R2. A first positive feedback path is provided from one side of the telephone line through a 0.1 microfarad coupling capacitor C2 and through a 130 kilo-ohm resistor R21 to the non-inverting input of amplifier Z1A. Resistor R21 is connected to a grounded 91 kilo-ohm resistor R22. Positive feedback is also provided to the inverting input of amplifier Z1A through a 0.1 microfarad coupling capacitor C5 which is connected to the negative input of amplifier Z1A through a 130 kilo-ohm resistor R26. Resistors R24 and R28 (180 kilo-ohm each) are connected to the non-inverting input of amplifier Z2A. Resistor R28 provides feedback from the output of amplifier Z1B, and resistor R24 provides input signals to amplifier Z1B from the output of amplifier Z1A through coupling capacitor C3. Since the value of resistor R28 equals the value of resistor R24, Z2A operates at unity gain, inverting Z1A's output to provide a balanced, bridged output. Capacitor C3 isolates amplifier Z1B from any direct current offset voltages that may be present on the output of amplifier Z1A. The negative input of amplifier Z1A is coupled to the output through a 100 picofarad capacitor C6 which is shunted by a 180 kilo-ohm resistor R30. Resistor R22 is chosen so that it is the same value as the parallel combination of resistors R30 and R32; so as to maintain differential input common mode rejection. For optimum high frequency common mode rejection, a capacitor C7, equal in value to capacitor C6 is added in parallel with resistor R22.

The outgoing audio signals are introduced to the negative input of amplifier Z1A through a resistor R32. The incoming audio signals may be derived directly from the output of amplifier Z1B, as shown, or from the output of amplifier Z1A, and no additional amplifiers are required.

For the circuit of FIG. 4:

$$G = \left(\frac{180K}{130K}\right) (2) \cdot \frac{(330/2)}{(330/2) + 620}$$

active gain × 2    passive loss
because of
differential
feedback
(2 loops)

$G = (2.77)(0.21) = 0.582$

∴ impedance multiplier ratio $= \frac{1}{1 - 0.582} = 2.392$

Nominal $Z$ = 330 ohm in parallel with 1240 ohms

Nominal $Z = \frac{(330)(1240)}{330 + 1240} = 261$ ohms

∴ A.C. effective $Z = (2.392)(261) = 620$ ohms

The invention provides, therefore, a simple interface circuit for coupling a telephone answering machine to the telephone line which fulfills all the criteria of such interface circuits, yet which does not require a transformer.

It will be appreciated that while particular embodiments of the invention have been shown and described, modifications may be made. It is intended in the following claims to cover all modifications which come within the true spirit and scope of the invention.

What is claimed is:

1. A circuit for interfacing a telephone answering machine to a telephone line, including: a transmit amplifier circuit for audio signals to be introduced to the telephone line and including first and second differential amplifiers; circuitry for connecting the output of said amplifier circuit to the telephone line including an output circuit connected to said differential amplifiers to provide a balanced output between the outputs of said differential amplifiers; a resistor of a selected resistance value included in said circuitry adapted to be connected across said telephone line to provide a direct current terminating impedance for the telephone line; and a positive feedback circuit connected to said transmit amplifier circuit to enable said transmit amplifier circuit to increase the effective impedance of said resistor to an increased apparent alternating current impedance in the presence of audio signals.

2. The interface circuit defined in claim 1, in which said first differential amplifier is a unity gain inverting amplifier.

3. The interface circuit defined in claim 2, in which said amplifier circuit includes first and second resistors connected to the input of said second differential amplifier for setting the gain of said second differential amplifier and thereby establishing the set point of said balanced output.

4. The interface circuit defined in claim 1, in which said positive feedback circuit provides differential positive feedback for said first and second differential amplifiers.

5. The interface circuit defined in claim 4, and which includes circuit means connected to the output of one of said first and second differential amplifiers to derive amplified audio signals therefrom corresponding to audio signals received from the telephone line.

* * * * *